(12) United States Patent
Bassman et al.

(10) Patent No.: US 10,735,227 B1
(45) Date of Patent: Aug. 4, 2020

(54) SYSTEM AND METHOD TO MONITOR COMPONENT WEAR ON HIGH SPEED SERIAL INTERFACES

(71) Applicant: DELL PRODUCTS, LP, Round Rock, TX (US)

(72) Inventors: Robert G. Bassman, The Hills, TX (US); Stuart Allen Berke, Austin, TX (US); Bhyrav M. Mutnury, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/385,403

(22) Filed: Apr. 16, 2019

(51) Int. Cl.
*H04L 25/03* (2006.01)
*H04L 25/02* (2006.01)

(52) U.S. Cl.
CPC .... *H04L 25/03885* (2013.01); *H04L 25/0272* (2013.01); *H04L 25/03019* (2013.01); *H04L 25/03267* (2013.01)

(58) Field of Classification Search
CPC ........... H04L 25/0272; H04L 25/03006; H04L 25/03019; H04L 25/03254; H04L 25/03267; H04L 25/03878; H04L 25/03885; H04L 25/03949; H04L 25/03987; H04L 25/061; H04L 25/062; H04L 25/063
USPC ....... 375/219, 220, 229, 232, 257, 285, 346, 375/348–350
See application file for complete search history.

(56) References Cited

U.S. PATENT DOCUMENTS

| | | | |
|---|---|---|---|
| 7,548,994 | B2 | 6/2009 | Ali et al. |
| 8,396,110 | B1* | 3/2013 | Hsieh ................ H04L 25/03057 375/229 |
| 8,694,709 | B2 | 4/2014 | Loffink |
| 2009/0097541 | A1* | 4/2009 | Aziz ....................... H04L 1/205 375/233 |
| 2013/0107934 | A1* | 5/2013 | Zhou ................. H04L 25/03885 375/232 |
| 2013/0148712 | A1* | 6/2013 | Malipatil ............ H04L 25/0307 375/233 |
| 2013/0169314 | A1* | 7/2013 | Choudhary .............. H03K 5/00 327/91 |
| 2014/0269881 | A1* | 9/2014 | He ..................... H04L 25/03878 375/231 |
| 2014/0281845 | A1* | 9/2014 | Cyrusian ........... H04L 25/03057 714/819 |
| 2014/0307769 | A1* | 10/2014 | He ........................ H04L 7/0062 375/233 |

(Continued)

*Primary Examiner* — Young T Tse
(74) *Attorney, Agent, or Firm* — Larson Newman, LLP

(57) ABSTRACT

A receiver includes signal lanes to receive associated data bit streams, and a control module. The signal lanes each include configurable equalization modules to provide a selectable compensation value to the associated data bit stream. The control module performs back channel adaptations on each data bit stream to achieve a target bit error rate for the associated signal lane, determines a most common set of compensation values from the performance of the back channel adaptations, determines whether the compensation value is within a predetermined boundary for that selectable compensation value, and provides an alert when a first compensation value of the most common set of compensation values is not within the predetermined boundary for the first compensation value.

20 Claims, 4 Drawing Sheets

(56) References Cited

U.S. PATENT DOCUMENTS

| | | | |
|---|---|---|---|
| 2015/0180642 A1* | 6/2015 | Hsieh | H04L 7/0025 375/233 |
| 2015/0186281 A1 | 7/2015 | Cherian et al. | |
| 2016/0087816 A1* | 3/2016 | Patel | H04L 25/03878 375/232 |
| 2016/0105296 A1* | 4/2016 | Berke | H04L 25/03057 375/233 |
| 2016/0134443 A1* | 5/2016 | Berke | H04L 25/03885 375/232 |
| 2018/0032390 A1 | 2/2018 | Rahmanian et al. | |
| 2018/0356994 A1 | 12/2018 | Berke et al. | |

* cited by examiner

SYSTEM AND METHOD TO MONITOR COMPONENT WEAR ON HIGH SPEED SERIAL INTERFACES

FIELD OF THE DISCLOSURE

This disclosure generally relates to information handling systems, and more particularly relates to monitoring component wear using backchannel adaptation of high speed serial interfaces.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A receiver may include signal lanes to receive associated data bit streams, and a control module. The signal lanes may each include configurable equalization modules to provide a selectable compensation value to the associated data bit stream. The control module may perform back channel adaptations on each data bit stream to achieve a target bit error rate for the associated signal lane, determine a most common set of compensation values from the performance of the back channel adaptations, determine whether the compensation value is within a predetermined boundary for that selectable compensation value, and provide an alert when a first compensation value of the most common set of compensation values is not within the predetermined boundary for the first compensation value.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
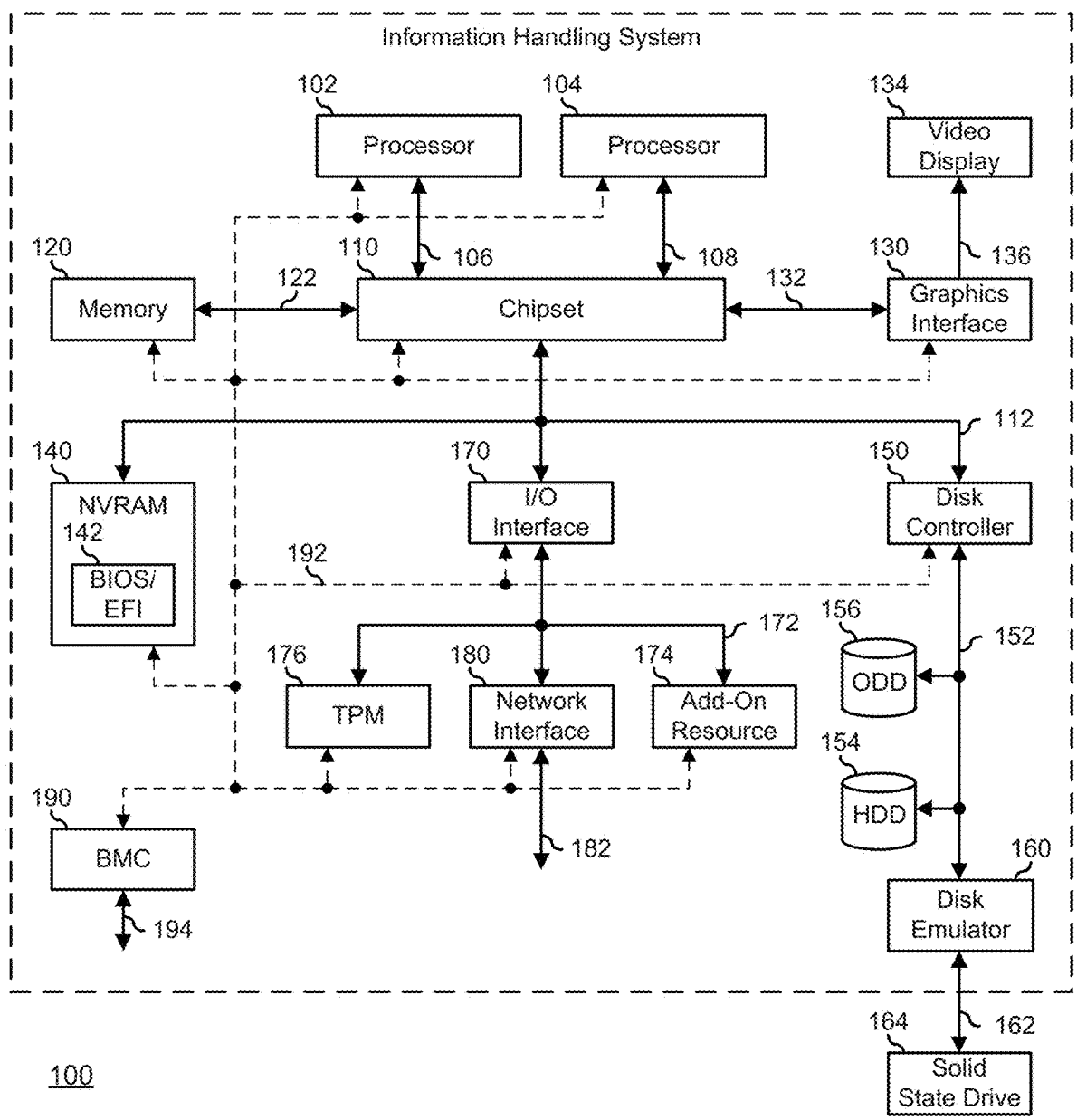
FIG. 1 is a block diagram of an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid state drive (SSD) 164, an input/output (I/O) interface 170 connected to an add-on resource 174 and a trusted platform module (TPM 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manages the data flows between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132, and provides a video display output 136 to a video display 134.

An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices.

In a particular embodiment, network interface 180 includes a network interface card (NIC) or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a WiFi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof.

Network channel 182 can be connected to an external network resource (not illustrated). The network resource can include another information handling system, a data storage system, another network, a grid management system, another suitable resource, or a combination thereof. BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like.

The term baseboard management controller is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 180 can vary considerably based on the type of information handling system. BMC 190 can operate in accordance with an Intelligent Platform Management Interface (IPMI). Examples of BMC 190 include an Integrated Dell Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) GUI associated with BMC 190, an interface defined by the Distributed Management Taskforce (DMTF) (such as a Web Services Management (WS-MAN) interface, a Management Component Transport Protocol (MCTP) or, a Redfish interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated onto another element of the information handling system such as chipset 110, or another suitable element, as needed or desired. As such, BMC 190 can be part of an integrated circuit or a chip set within information handling system 100. An example of BMC 190 includes an integrated Dell remote access controller (iDRAC), or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

As the speed of high speed serial interfaces increases, variations in circuit design, component manufacture, environmental conditions, and other factors make it increasingly difficult to ensure highly reliable data transmission. In particular, transmitter and receiver equalization mechanisms to compensate for channel loss are calibrated on a best-effort basis, where settings that result in a "good enough" compensation solution are quickly obtained, in favor of iterative processes that might yield a more optimal solution, but which require an inordinate amount of time for such link training.

Figure 2:
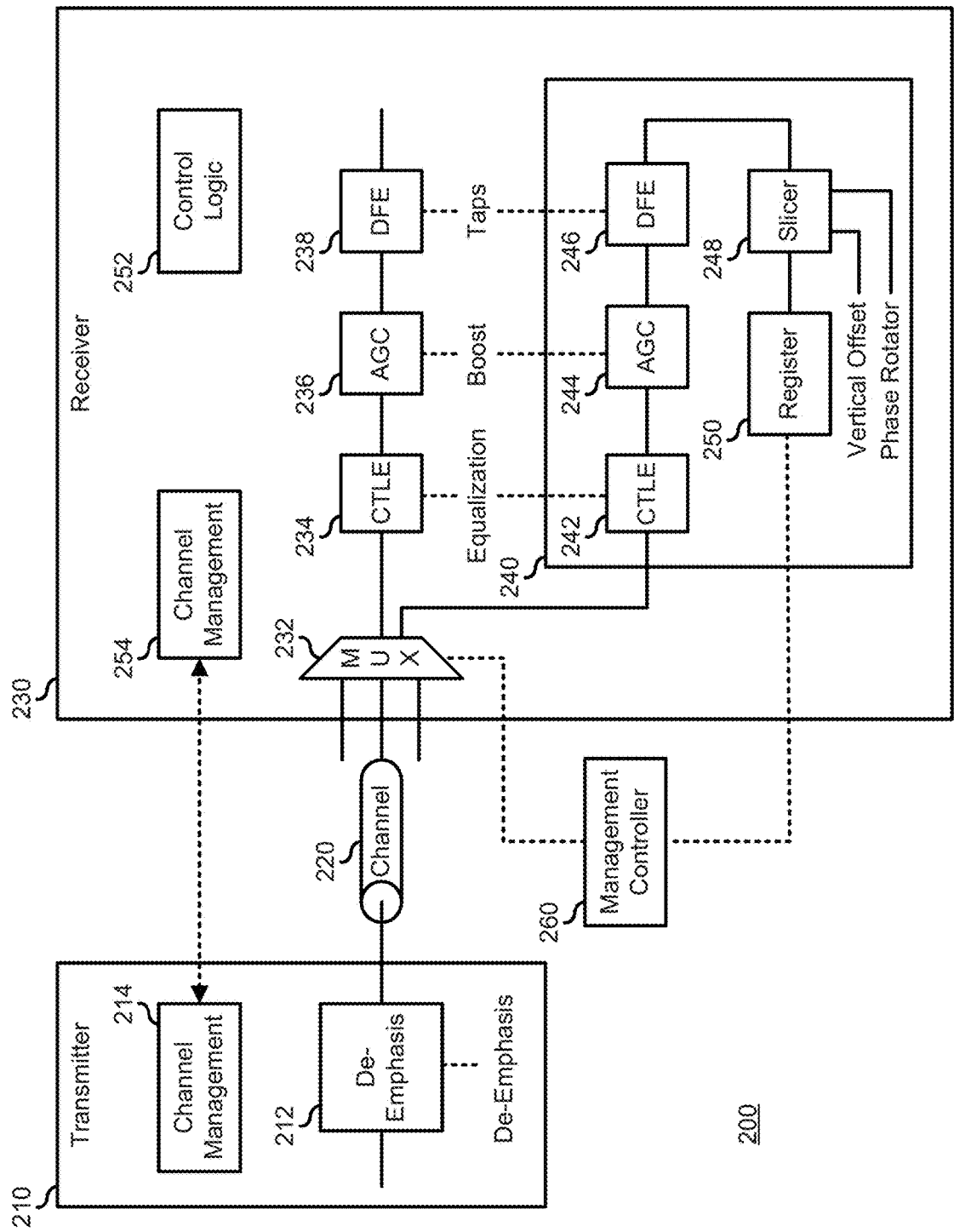
FIG. 2 illustrates a high speed serial interface according to an embodiment of the present disclosure.

FIG. 2 illustrates an embodiment of a high speed serial channel 200 of an information handling system. For the purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Serial channel 200 includes a transmitter 210, a transmission channel 220, and a receiver 230. Serial channel 200 represents one half of a bi-directional serial data link for communicating data from transmitter 210 located at a first component to receiver 230 located at a second component. The other half of the bi-directional serial data link is similar to serial channel 200, but with a receiver in the first component, and a transmitter in the second component, for communicating data back from the second component to the first component. Here, the components can be understood to include elements within an information handling system, such as components that are attached to one or more printed circuit board of the information handling system, where transmission channel 220 can represent one or more circuit traces on the printed circuit board, and can include one or more connectors. The components can also be understood to include devices of an information handling system, such as a hard drive, a storage array, and the like, that are separate from the printed circuit board of the information handling system, where transmission channel 220 can include one or more transmission cables. An example of serial channel 200 includes a PCI-Express (PCIe) channel that is in compliance with one or more PCIe specification, up to, and including the PCIe 4.0 Specification, a Serial ATA (SATA) channel that is in compliance with one or more SATA specification, up to, and including the SATA 3.2 Specification, a SAS channel that is in compliance with one or more SAS specification, up to and including the Serial Attached SCSI 4.0 Standard, or another high speed serial channel.

Serial channel 200 operates to provide back channel adaptation where transmitter 210 and receiver 230 communicate with each other to optimize and adjust various compensation values within the transmitter and the receiver to compensate for the insertion loss of transmission channel 220. A determination is made as to whether or not a set of compensation values is satisfactory based upon a determination of the bit error rate (BER) associated with the set of values. It is possible for multiple different sets of compensation values to result in acceptable BER in serial channel 200. Moreover, even on a particular information handling system, operating at different times, the back channel adaptation mechanism may operate to provide different sets of compensation values based upon minute variations in the operating condition of the information handling system. As such, serial channel 200 operates to perform the back channel adaptation repeatedly, recording the set of compensation values for each iteration of the back channel adaptation, in order to determine a most common or most frequently recurring set of compensation values. Then serial channel 200 further operates to use the most frequently recurring set of compensation values as a seed for further optimization of the receiver eye in order to determine the final run time set of compensation values.

For example, a typical back channel adaptation operation can operate at a 10 gigabit per second (Gb/s) data rate, and can provide a training sequence of 2000 bits, such that the back channel adaptation operation takes 200 microseconds (µs), and serial channel 200 can operate to provide 1000 iterations of the back channel adaptation operation, such that the common set of compensation values is determined in 0.2 s. Using the common set of compensation values, serial channel 200 can adjust each value of the common set of compensation values by +/−1 setting value, and re-run the back channel adaptation operation in order to determine if the receiver eye is improved. Serial channel 200 can then select the set of values that produces the best receiver eye.

Transmitter 210 includes a de-emphasis module 212 and a channel management module 214. In operation, serial data is provided to de-emphasis module 212, and the de-emphasis module operates to provide a reduction in the signal levels of the serial data after a first data bit is transmitted, in order to de-emphasize the subsequent data bits and to transmit the de-emphasized serial data to receiver 230 via transmission channel 220. The amount of de-emphasis is determined based upon a de-emphasis setting. For example, transmitter 210 can support 21 de-emphasis settings which each prescribe a different amount of de-emphasis, from 0 dB to 10 dB, in 0.5 dB steps. Other numbers of settings and amounts of de-emphasis prescribed by the de-emphasis setting can be utilized, as needed or desired. Channel management module 214 will be described below.

Receiver 230 includes a multiplexor 232, a continuous time linear equalization (CTLE) module 234, an automatic gain control (AGC) module 236, a decision feedback equalization (DFE) module 238, a pseudo-latch 240, a control logic module 252, and a channel management module 254. In operation, the de-emphasized serial data is received by multiplexor 232, the multiplexor provides the received signal to CTLE module 234, and the CTLE module operates to provide compensation for inter-signal interference (ISI) in order to open the signal eye of the received signal. The amount of compensation is determined based upon an equalization setting. For example, receiver 230 can support 21 equalization settings which each prescribe a different amount of equalization, from 0 dB to 10 dB, in 0.5 dB steps. Other numbers of settings and amounts of equalization prescribed by the equalization setting can be utilized, as needed or desired.

The equalized signal is provided from CTLE module 234 to AGC module 236. AGC module 236 operates to provide linear gain to the signal received from CTLE module 234 to further open the signal eye of the received signal. The amount of gain is determined by a gain setting, and can support 21 gain settings which each prescribe a different amount of gain, for example, from 0 dB to 10 dB, in 0.5 dB steps. Other numbers of settings and amounts of gain prescribed by the gain setting can be utilized, as needed or desired.

The amplified signal is provided from AGC module 236 to DFE module 238. DFE module 238 operates to provide feedback based compensation to the received signal. The amount of compensation is determined by enabling a number of circuit feedback taps. For example, DFE module 238 can support up to 16 taps that provide compensation based upon up to 16 previous data points. In a particular embodiment, DFE module 238 can be turned off, thereby reducing the power consumed by receiver 230. In another embodiment, one or more tap of DFE module 238 can be turned on based upon the taps setting, while the rest of the taps are placed into a tri-state condition, that is, with power applied, but with the taps not providing feedback to the resultant DFE compensation. In yet another embodiment, one or more tap of DFE module 238 can be turned on based upon the taps setting, while the rest of the taps are turned off, thereby reducing the power consumed by receiver 230. Other numbers of taps can be utilized, as needed or desired.

Figure 3:
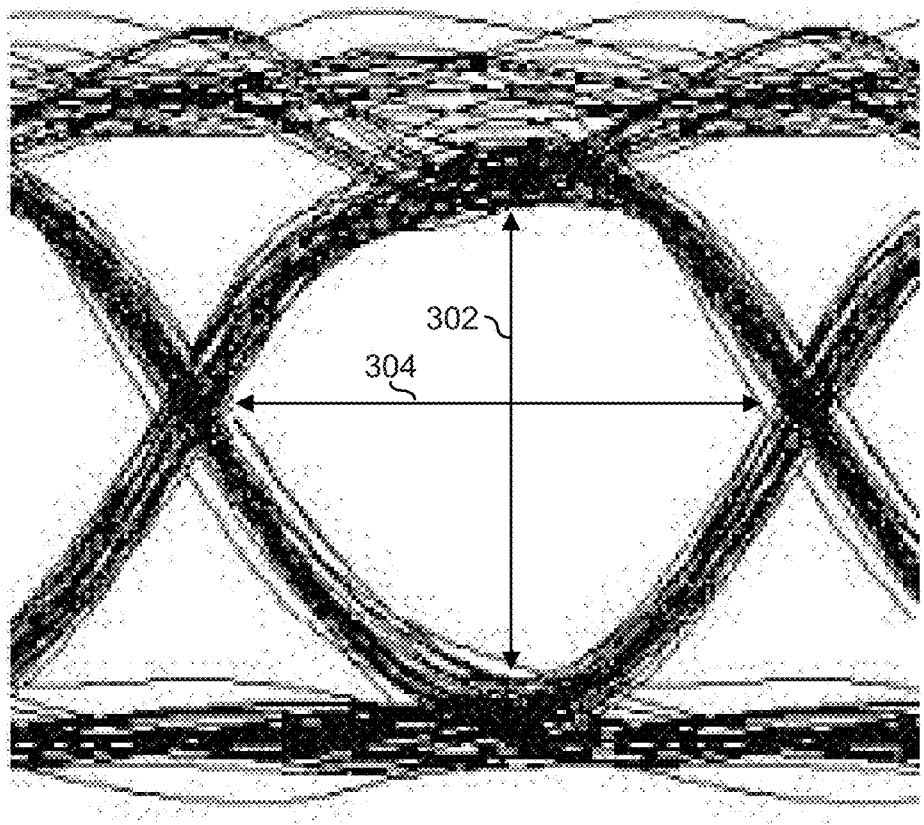
FIG. 3 illustrates a receiver eye diagram for the serial interface of FIG. 2.

In addition to providing the receive signal to CTLE module 234, multiplexor 232 provides the received signal to pseudo-latch 240 to characterize the receiver eye of the received signal. Pseudo-latch 240 provides a digital representation of the analog signal received by receiver 230, and analyzes the digital representation of the analog signal, such as the receiver eye 300 of FIG. 3, to determine the eye height 302 and the eye width 304 of the analog signal. Pseudo-latch 240 includes a CTLE module 242 similar to CTLE module 234, an AGC module 244 similar to AGC module 236, a DFE module 246 similar to DFE module 238, an adjustable slicer 248, and a register 250. CTLE module 242 is provided with the equalization setting, AGC module 244 is provided with the gain setting, and DFE module 246 is provided with the taps setting. In this way, pseudo-latch 240 operates to provide the same compensation for ISI as is provided in the main latch chain of CTLE module 234, AGC module 236, and DFE module 238, in order to open the signal eye of the received signal for further analysis, as described below.

Adjustable slicer 248 operates to select various timings and threshold levels for sampling the received and compensated signal from DFE module 246. As such, adjustable slicer 248 includes a phase rotator input which selects a timing offset for sampling the received and compensated signal, and a vertical offset input which selects a voltage offset for the detection threshold for determining the state of the received and compensated signal. At any given setting of the equalization setting, the gain setting, and the taps setting, the phase rotator input and the voltage offset input settings are adjusted, for example as "plus" and "minus" settings around a nominal phase and a nominal voltage offset associated with a slicer in the main latch chain. The adjustment levels are increased and decrease sequentially until the signal becomes undetectable. By determining the offsets from the nominal phase and nominal voltage offset levels, pseudo-latch 240 determines the eye characteristics, that is, the eye height and the eye width of receiver 230 for the given settings of the equalization setting, the gain setting, and the taps setting.

Register 250 stores the eye height and eye width information in order to determine a set of compensation values that provides the best receiver eye for receiver 230. A management controller 260 operates to coordinate the determination of receiver eye information for multiple serial channels similar to serial channel 200. As such, multiplexor 232 operates to receive inputs from multiple transmission channels similar to transmission channel 220, and selectively routes the received signals to pseudo-latch 240. In this way, a multi-channel device can include a single set of elements for determining the receiver eye information of multiple transmission channels.

In operation, control logic module 252 performs the back channel adaptation repeatedly, recording the set of compensation values for each iteration of the back channel adaptation in a memory of receiver 230, in order to determine a most common or most frequently recurring set of compensation values. In a particular embodiment, only the set of compensation values for receiver 230 are considered in determining the most frequently recurring set of compensation values. In another embodiment, the compensation values for both transmitter 210 and receiver 230 are considered in determining the most frequently recurring set of compensation values. In a particular embodiment, the memory includes a counter associated with each particular combination of compensation value settings, and each time a particular set of compensation values is derived, the counter is incremented. Then, when the iterations of the back channel adaptation are complete, control logic module 252 determines which counter includes the highest count. In another embodiment, receiver 230 includes a number of storage locations that is equal to the number of iterations, and on each successive iteration, the set of compensation values for that iteration are stored in the associated storage location. Then, when the iterations of the back channel adaptation are complete, control logic module 252 parses the values of the storage locations to determine the most common value.

Control logic module 252 then uses the most common set of compensation values as a seed for further optimization of the receiver eye, by directing each of de-emphasis module 212, CTLE module 234, AGC module 236, and DFE module 238 to iteratively adjust the respective compensation values by +/– one (1) setting value, and direct the received signal to through multiplexor 232 to pseudo-latch 240 to determine the receiver eye height and eye width associated with each adjusted setting. Finally, the set of compensation values that resulted in the best eye height and eye width is utilized as the final run time set of compensation values.

In a particular embodiment, control logic module 252 operates at run time to reevaluate the compensation values to maintain a superior receiver eye as conditions on channel 220 change. For example, as the operating environment of serial channel 200 changes, the optimum set of compensation values may shift. Further, as the elements of serial channel 200 age, various degradation effects can work to degrade the performance of the serial channel. However, it is possible that as control logic 252 operates to reevaluate the compensation values, the new sets of compensation values may mask actual mechanical or electrical failures by tuning the compensation values to extremes to maintain an adequate receiver eye. In particular, the use of cables is increasing as the cost, density, and signal quality of cables improves over circuit traces on a printed circuit board. Further, usage models where components of an information handling system that are hot-swappable are increasingly utilizing flexible cables affixed to retractable sleds. Such increased usage models for cables over circuit traces leads to increased mechanical and electrical stresses on the cables themselves, on the contact points between the cables and the printed circuit boards to which they are attached, and to other elements of the components of a serial channel. Further, such stresses may result in slow degradation or sudden degradation of performance on the serial channel, depending on the stresses or failure modes experienced. Moreover, the failure modes may affect a single serial channel, or multiple serial channels in a link simultaneously. Thus, in some cases, failures may be foreshadowed by degraded link speeds, and other cases may only present intermittent failures while still being able to be tuned to the highest available link speeds.

Generally, serial channel 200 is well modeled and understood in the design and manufacturing processes. As such, the equalization values for de-emphasis module 212, CTLE module 234, AGC module 236, and DFE module 238 will be expected to be optimized to within certain ranges during back channel adaptation by control logic module 252. Further, the optimized equalization values will not generally vary outside these optimum ranges under normal operation, even accounting for environmental variations and long term degradations. Thus, when control logic module 252 performs back channel adaptations that result in equalization coefficients that are outside of the expected ranges, the control logic module determines that a problem is happening on serial channel 200. Further, it has been determined that variations in equalization coefficients for the different compensation modules may indicate different failure modes. For example, excessively high compensation coefficients for DFE module 238 indicates that channel 220 is experiencing too much reflection, while excessively high compensation coefficients for CTLE module 234 indicates a loss of signal. In another example, equalization coefficients that are outside of the expected ranges on only serial channel 220 may indicate that channel 220 is having a problem, while equalization coefficients that are outside of the expected ranges on several serial channels of a serial link may indicate that the associated transmitter or receiver component is having a problem. Moreover, where the equalization coefficients remain within the expected ranges, but begin to drift from a more central value to a more extreme value, control logic module 252 operates to provide an indication that the particular channel is drifting, for example to management controller 260. Further, control logic module 252 operates to determine a rate of degradation based upon how rapidly a particular equalization coefficient degrades. Table 1 illustrates receiver equalization coefficients for several serial channels. Here, the serial channel designated PHY17 is seen to need excessive gain and DFE compensation, and is therefore indicated as a failing lane.

TABLE 1

| Receiver Equalization Coefficients | | | | |
| --- | --- | --- | --- | --- |
| PHY | CTLE | GAIN | DFE0 | DFE1 |
| 17 | 5 | 18 | −26 | −23 |
| 18 | 3 | 8 | −17 | −12 |
| 19 | 7 | 6 | −15 | −10 |

Figure 4:
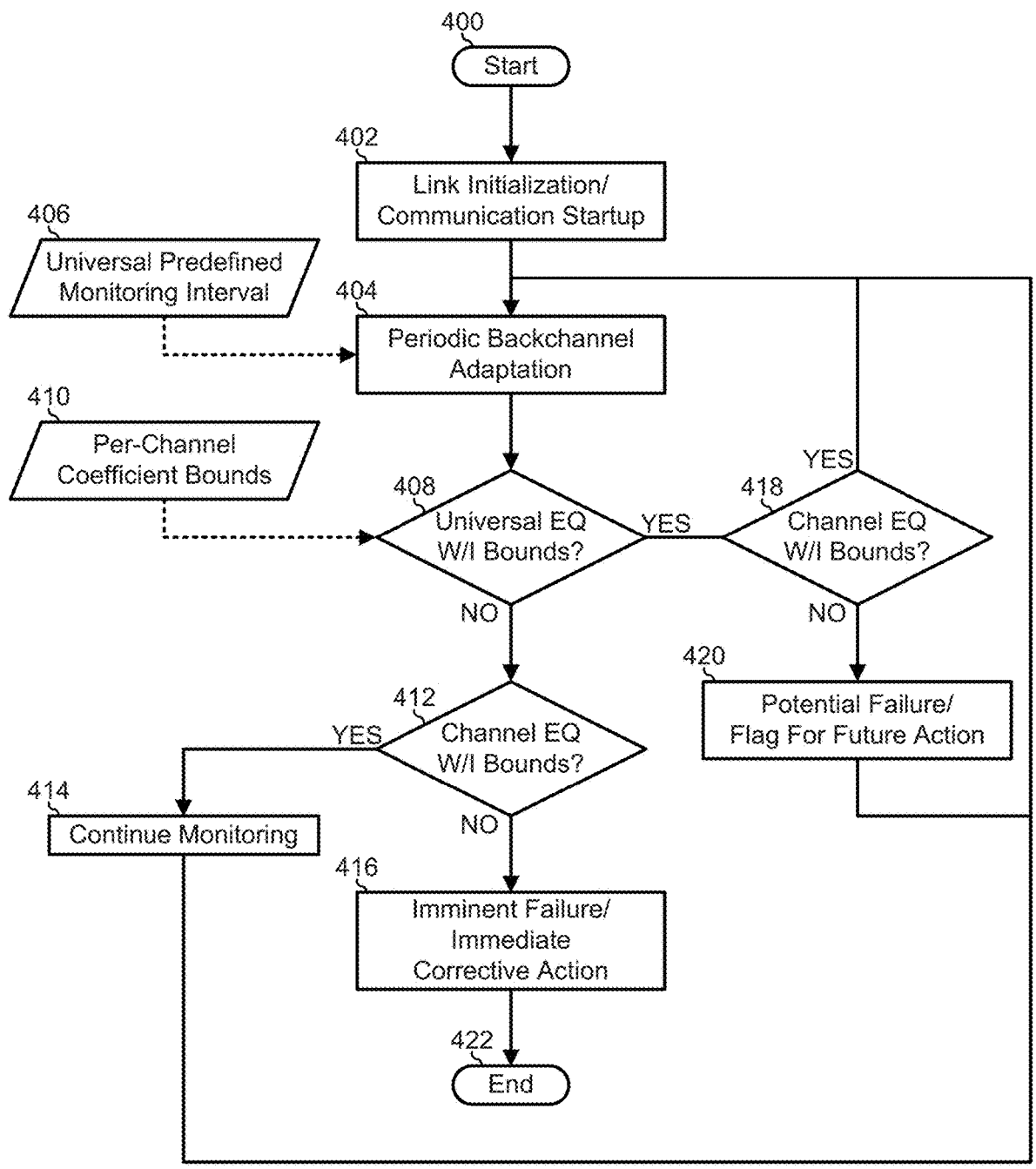
FIG. 4 is a flowchart illustrating a method of determining compensation values in a serial interface according to an embodiment of the present disclosure.

FIG. 4 illustrates a method to monitor component wear out on High speed serial interfaces starting at block 400. A serial link is initialized and communication is started via the serial link in block 402. In particular, in accordance with the standards and practices of the particular type of serial link, the serial link may include handshaking and negotiation. Further, the serial link undergoes auto-adaptation and convergence of equalization coefficients. The serial link undergoes periodic back channel adaptation to determine the equalization coefficients during run time in block 404. Here, the back channel adaptation is performed based upon a predefined monitoring interval that is ascribed for all serial channels in the serial link in block 406. The resulting equalization coefficients will be understood to be bounded to within particular ranges when the serial link is operating normally. The boundaries are provided in block 410. It will be noted that there may be universal equalization coefficients for the serial link as a whole, and these universal equalization coefficients may be expected to be within universal equalization coefficient boundaries. In addition, the individual serial channels in the serial link may have channel equalization coefficients associated that may be expected to be within channel equalization coefficient boundaries. A decision is made as to whether or not the newly determined universal equalization coefficients are within their prescribed boundaries in decision block 408.

If the newly determined universal equalization coefficients are not within their prescribed boundaries, the "NO" branch of decision block 408 is taken and a decision is made as to whether or not the newly determined channel equalization coefficients for the individual serial channels within the link are within their prescribed boundaries in decision block 412. If so, the "YES" branch of decision block 414 is taken, monitoring of the equalization coefficients is continued in block 414, and the method returns to block 404 where the serial link continues periodic back channel adaptation. If the newly determined channel equalization coefficients for the individual serial channels within the link are not within their prescribed boundaries, the "NO" branch of decision block 412 is taken, the serial link is determined to be in imminent danger of failure and an indication that immediate corrective action is to be taken is given in block 416, and the method ends in block 416.

Returning to decision block 408, if the newly determined universal equalization coefficients are within their prescribed boundaries, the "YES" branch is taken and a decision is made as to whether or not the newly determined channel equalization coefficients for the individual serial channels within the link are within their prescribed boundaries in decision block 418. If so, the "YES" branch of decision block 418 is taken and the method returns to block 404 where the serial link continues periodic back channel adaptation. If the newly determined channel equalization coefficients for the individual serial channels within the link are not within their prescribed boundaries, the "NO" branch of decision block 418 is taken, the serial link is flagged to be in potential danger of failure and the serial link is flagged for future action in block 420, and the method ends in block 416.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A receiver, comprising:
    a plurality of signal lanes each to receive a data bit stream, and each signal lane including a plurality of equalization modules each configurable to provide a selectable compensation value to the data bit stream received by an associated signal lane, wherein each selectable compensation value represents an equalization coefficient for the associated equalization module; and
    a control module configured to:
        perform on each signal lane a plurality of back channel adaptations on an associated data bit stream to achieve a target bit error rate for the associated signal lane, each back channel adaptation being associated with a set of compensation values of the equalization modules;
        determine for each signal lane a most common set of compensation values derived from the performance of the back channel adaptations;
        determine, for each selectable compensation value of the most common set of compensation values, whether or not a particular compensation value is within a predetermined boundary for that selectable compensation value; and
        provide an indication when the particular compensation value of the most common set of compensation values is not within the predetermined boundary for the particular compensation value.

2. The receiver of claim 1, wherein the control module is further configured to;
    determine whether or not the particular compensation value is a universal equalization coefficient for the plurality of signal lanes.

3. The receiver of claim 2, wherein the control module is further configured to:
    determine whether or not the particular compensation value is also a compensation value that is specific to a particular one of the signal lanes when the particular compensation value is the universal equalization coefficient for the plurality of signal lanes, wherein the indication indicates that the receiver is failing when the particular compensation value is also the compensation value that is specific to the particular signal lane.

4. The receiver of claim 2, wherein the control module is further configured to:
    determine whether or not the particular compensation value is a compensation value that is specific to a particular one of the signal lanes when the particular compensation value is not the universal equalization coefficient for the plurality of signal lanes, wherein the indication indicates that the receiver may fail when the particular compensation value is also the compensation value that is specific to the particular signal lane.

5. The receiver of claim 1, wherein the plurality of equalization modules for each signal lane includes a Decision Feedback Equalization (DFE) module.

6. The receiver of claim 5, wherein, when a compensation value for the DFE module is above a predetermined boundary for the DFE module, the control module is further configured to:
    provide the indication to indicate that a channel associated with the signal lane is experiencing excessive reflections.

7. The receiver of claim 1, wherein the plurality of equalization modules for each signal lane includes a Continuous Time Linear Equalization (CTLE) module.

8. The receiver of claim 7, wherein, when a compensation value for the CTLE module is above a predetermined boundary for the CTLE module, the control module is further configured to:
provide the indication to indicate that a channel associated with the signal lane is experiencing a loss of signal.

9. A method, comprising:
receiving, by a plurality of signal lanes of a receiver, an associated bit stream;
equalizing, by a plurality of equalization modules of each signal lane, the associated bit stream;
providing, by each equalization module, a selectable compensation value to the bit stream received by an associated signal lane, wherein each selectable compensation value represents an equalization coefficient for the associated equalization module;
performing, by a control module of the receiver, on each signal lane a plurality of back channel adaptations on the associated bit stream to achieve a target bit error rate for the associated signal lane, each back channel adaptation being associated with a set of compensation values of the equalization modules;
determining, by the control module, for each signal lane a most common set of compensation values derived from the performance of the back channel adaptations;
determining, by the control module, for each selectable compensation value of the most common set of compensation values, whether or not a particular compensation value is within a predetermined boundary for that selectable compensation value; and
providing, by the control module, an indication when the particular compensation value of the most common set of compensation values is not within the predetermined boundary for the particular compensation value.

10. The method of claim 9, further comprising;
determining, by the control module, whether or not the particular compensation value is a universal equalization coefficient for the plurality of signal lanes.

11. The method of claim 10, further comprising:
determining, by the control module, whether or not the particular compensation value is also a compensation value that is specific to a particular one of the signal lanes when the particular compensation value is the universal equalization coefficient for the plurality of signal lanes, wherein the indication indicates that the receiver is failing when the particular compensation value is also the compensation value that is specific to the particular signal lane.

12. The method of claim 10, further comprising:
determining, by the control module, whether or not the particular compensation value is a compensation value that is specific to a particular one of the signal lanes when the particular compensation value is not the universal compensation value for the plurality of signal lanes, wherein the indication indicates that the receiver may fail when the particular compensation value is also the compensation value that is specific to the particular signal lane.

13. The method of claim 9, wherein the plurality of equalization modules for each signal lane includes a Decision Feedback Equalization (DFE) module.

14. The method of claim 13, wherein, when a compensation value for the DFE module is above a predetermined boundary for the DFE module, the method further comprises:
providing, by the control module, the indication to indicate that a channel associated with the signal lane is experiencing excessive reflections.

15. The method of claim 9, wherein the plurality of equalization modules for each signal lane includes a Continuous Time Linear Equalization (CTLE) module.

16. The method of claim 15, wherein, when a compensation value for the CTLE module is above a predetermined boundary for the CTLE module, the method further comprises:
providing, by the control module, the indication to indicate that a channel associated with the signal lane is experiencing a loss of signal.

17. A serial communication channel system, comprising:
a transmitter; and
a receiver including
a plurality of signal lanes each to receive a data bit stream from the transmitter, and each signal lane including a plurality of equalization modules each configurable to provide a selectable compensation value to the data bit stream received by the associated signal lane, wherein each selectable compensation value represents an equalization coefficient for the associated equalization module; and
a control module configured to:
perform on each signal lane a plurality of back channel adaptations on an associated data bit stream to achieve a target bit error rate for the associated signal lane, each back channel adaptation being associated with a set of compensation values of the equalization modules;
determine for each signal lane a most common set of compensation values derived from the performance of the back channel adaptations;
determine for each selectable compensation value of the most common set of compensation values, whether or not a particular compensation value is within a predetermined boundary for that selectable compensation value; and
provide an indication when the particular compensation value of the most common set of compensation values is not within the predetermined boundary for the particular compensation value.

18. The serial communication channel system of claim 17, wherein the control module is further configured to;
determine whether or not the particular compensation value is a universal equalization coefficient for the plurality of signal lanes.

19. The serial communication channel system of claim 18, wherein the control module is further configured to:
determine whether or not the particular compensation value is also a compensation value that is specific to a particular one of the signal lanes when the particular compensation value is the universal equalization coefficient for the plurality of signal lanes, wherein the indication indicates that the receiver is failing when the particular compensation value is also the compensation value that is specific to the particular signal lane.

20. The serial communication channel system of claim 18, wherein the control module is further configured to:
determine whether or not the particular compensation value is a compensation value that is specific to a particular one of the signal lanes when the particular compensation value is not the universal compensation value for the plurality of signal lanes, wherein the indication indicates that the receiver may fail when the particular compensation value is also the compensation value that is specific to the particular signal lane.

* * * * *

UNITED STATES PATENT AND TRADEMARK OFFICE
CERTIFICATE OF CORRECTION

Page 1 of 1

PATENT NO.        : 10,735,227 B1
APPLICATION NO.   : 16/385403
DATED             : August 4, 2020
INVENTOR(S)       : Robert G. Bassman et al.

It is certified that error appears in the above-identified patent and that said Letters Patent is hereby corrected as shown below:

In the Claims

Column 13, Lines 55-56: Please change "the universal compensation value" to --the universal equalization coefficient--

Column 14, Lines 65-66: Please change "the universal compensation value" to --the universal equalization coefficient--

Signed and Sealed this
Twentieth Day of October, 2020

Andrei Iancu
*Director of the United States Patent and Trademark Office*